(12) United States Patent
Ohki et al.

(10) Patent No.: US 8,205,651 B2
(45) Date of Patent: Jun. 26, 2012

(54) PNEUMATIC TIRE

(75) Inventors: Yukihiko Ohki, Hiratsuka (JP); Isamu Kishizoe, Hiratsuka (JP)

(73) Assignee: The Yokoyama Rubber Co., Ltd., Tokyo (JP)

( * ) Notice: Subject to any disclaimer, the term of this patent is extended or adjusted under 35 U.S.C. 154(b) by 727 days.

(21) Appl. No.: 12/302,234

(22) PCT Filed: Jun. 11, 2007

(86) PCT No.: PCT/JP2007/061750
§ 371 (c)(1),
(2), (4) Date: Nov. 24, 2008

(87) PCT Pub. No.: WO2007/145177
PCT Pub. Date: Dec. 21, 2007

(65) Prior Publication Data
US 2009/0114324 A1 May 7, 2009

(30) Foreign Application Priority Data

Jun. 12, 2006 (JP) .................................. 2006-162079
Jul. 21, 2006 (JP) .................................. 2006-199058

(51) Int. Cl.
*B60C 11/13* (2006.01)
(52) U.S. Cl. ............. 152/209.25; 152/209.1; 152/209.8; 152/209.9; 152/209.15; 152/209.18; 152/209.27
(58) Field of Classification Search ............... 152/209.1, 152/209.8, 209.9, 209.18, 209.25, 209.27, 152/209.15
See application file for complete search history.

(56) References Cited

U.S. PATENT DOCUMENTS

| 6,923,231 | B2 * | 8/2005 | Cantu' et al. | 152/209.18 |
| 7,178,570 | B2 * | 2/2007 | Murata | 152/209.15 |
| 2003/0047262 | A1 * | 3/2003 | Kousaie et al. | 152/209.8 |

(Continued)

FOREIGN PATENT DOCUMENTS

JP         A 7-195910         8/1995

(Continued)

*Primary Examiner* — Matthew Daniels
*Assistant Examiner* — Jacob Thomas Minskey
(74) *Attorney, Agent, or Firm* — Greer, Burns & Crain. Ltd.

(57) ABSTRACT

A pneumatic tire according to the present invention improves wet performance.

The pneumatic tire has a tread surface 1. A first main groove 2 extending in the circumferential direction TC of the tire is provided in the tread surface 1. First lateral grooves 7 extending from the first main groove 2 outward in the widthwise direction of the tire beyond one ground contact end TX1 of the tire are disposed at prescribed intervals in the circumferential direction TC of the tire. Blocks 8 are defined by the first main groove 2 and the first lateral grooves 7. The first lateral grooves 7 comprise inner groove portions 7A and outer groove portions 7B. The inner groove portions 7A extend with their widths gradually increasing from the first main groove 2 outward in the widthwise direction of the tire to midways of the first lateral grooves 7. The outer groove portions 7B extend with their widths gradually decreasing from the gradually increasing inner groove portions 7A outward in the widthwise direction of the tire beyond the one ground contact end TX1 of the tire. A circumferential narrow groove 5 which extends in the circumferential direction TC of the tire and is less in width than the first main groove 2 is disposed at boundary positions between the inner groove portions 7A and the outer groove portions 7B.

15 Claims, 3 Drawing Sheets

U.S. PATENT DOCUMENTS

| | | | |
|---|---|---|---|
| 2004/0134582 A1* | 7/2004 | Murata | 152/209.18 |
| 2005/0121123 A1* | 6/2005 | Nakagawa | 152/209.9 |

FOREIGN PATENT DOCUMENTS

| | | |
|---|---|---|
| JP | A 7-285302 | 10/1995 |
| JP | A 8-183310 | 7/1996 |
| JP | A 8-230415 | 9/1996 |
| JP | A 10-35225 | 2/1998 |
| JP | A 2000-135904 | 5/2000 |
| JP | A 2000-177325 | 6/2000 |
| JP | A 2003-170709 | 6/2003 |
| JP | A 2004-352049 | 12/2004 |

* cited by examiner

PNEUMATIC TIRE

This application is a U.S. National Phase under 35 U.S.C. §371 of International Application No. PCT/JP2007/061750, filed Jun. 11, 2007.

TECHNICAL FIELD

The present invention relates to pneumatic tires, and more particularly, to a pneumatic tire capable of improving wet performance.

TECHNICAL BACKGROUND

There have conventionally been proposed many pneumatic tires having a tread surface in which main grooves extending in the circumferential direction of the tire and lateral grooves extending in the widthwise direction of the tire are properly arranged to thereby improve wet performance (see patent documents 1 and 2, for example).

However, with an increase in consciousness for safety during driving of a vehicle in recent years, it is required to further improve tire performance. In particular, an accident during driving on a wet road surface on a rainy day could lead to a tragedy, and approaches to techniques for its improvement are strongly desired.

Patent Document 1: Japanese Patent Application Kokai Publication HEI 7-285302
Patent Document 2: Japanese Patent Application Kokai Publication HEI 8-230415

DISCLOSURE OF THE INVENTION

Problem to be Solved by the Invention

An object of the present invention is to provide a pneumatic tire which can improve wet performance.

Means for Solving the Problem

In order to achieve the above object, the present invention provides a pneumatic tire having a tread surface, a first main groove extending in a circumferential direction of the tire being provided in the tread surface, first lateral grooves extending from the first main groove outward in a widthwise direction of the tire beyond one ground contact end of the tire being disposed at prescribed intervals in the circumferential direction of the tire, blocks being defined by the first main groove and the first lateral grooves, wherein: the first lateral grooves comprise inner groove portions and outer groove portions, the inner groove portions having widths, the inner groove portions extending with the widths gradually increasing from the first main groove outward in the widthwise direction of the tire to midways of the first lateral grooves, the outer groove portions having widths, the outer groove portions extending with the widths gradually decreasing from the gradually increasing inner groove portions outward in the widthwise direction of the tire beyond the one ground contact end of the tire; and a circumferential narrow groove which extends in the circumferential direction of the tire and is less in width than the first main groove is disposed at boundary positions between the inner groove portions and the outer groove portions.

Effect of the Invention

According to the present invention mentioned above, water in the first lateral grooves during running on a wet road surface can be more effectively led to the boundary positions between the inner groove portions and the outer groove portions by the first lateral grooves than by lateral grooves constant in width, and can be efficiently expelled through the circumferential narrow groove disposed at the boundary positions. Accordingly, driving stability during running on a wet road surface can be improved.

If a main groove similar to the first main groove is disposed in the alternative of the circumferential narrow groove to improve drainage characteristics, tread stiffness in an area outward of the first main groove in the widthwise direction of the tire is reduced, which decreases driving stability during running on a dry road surface. The circumferential narrow groove does not create such a problem.

DESCRIPTION OF THE SYMBOLS

| | |
|---|---|
| 1 | tread surface |
| 1A | vehicle inner side region |
| 1B | vehicle outer side region |
| 2 | first main groove |
| 3 | second main groove |
| 4 | third main groove |
| 5 | circumferential narrow groove |
| 6 | center rib |
| 7 | first lateral groove |
| 7A | inner groove portion |
| 7B | outer groove portion |
| 8 | block |
| 9 | second lateral groove |
| 10 | assistant lateral groove |
| 11 | block |
| 12 | third lateral groove |
| 13 | block |
| 14 | narrow groove |
| 16 | bottom-raising portion |
| 21 | narrow lateral groove |
| GS | groove wall surface |
| TC | tire circumferential direction |
| TE | tire equatorial plane |
| TX1, TX2 | tire ground contact end |
| W | tire ground contact width |
| d1 | first lateral groove depth |

BEST MODES FOR CARRYING OUT THE INVENTION

Embodiments of the present invention will be described in detail below with reference to the attached drawings.

Figure 1:
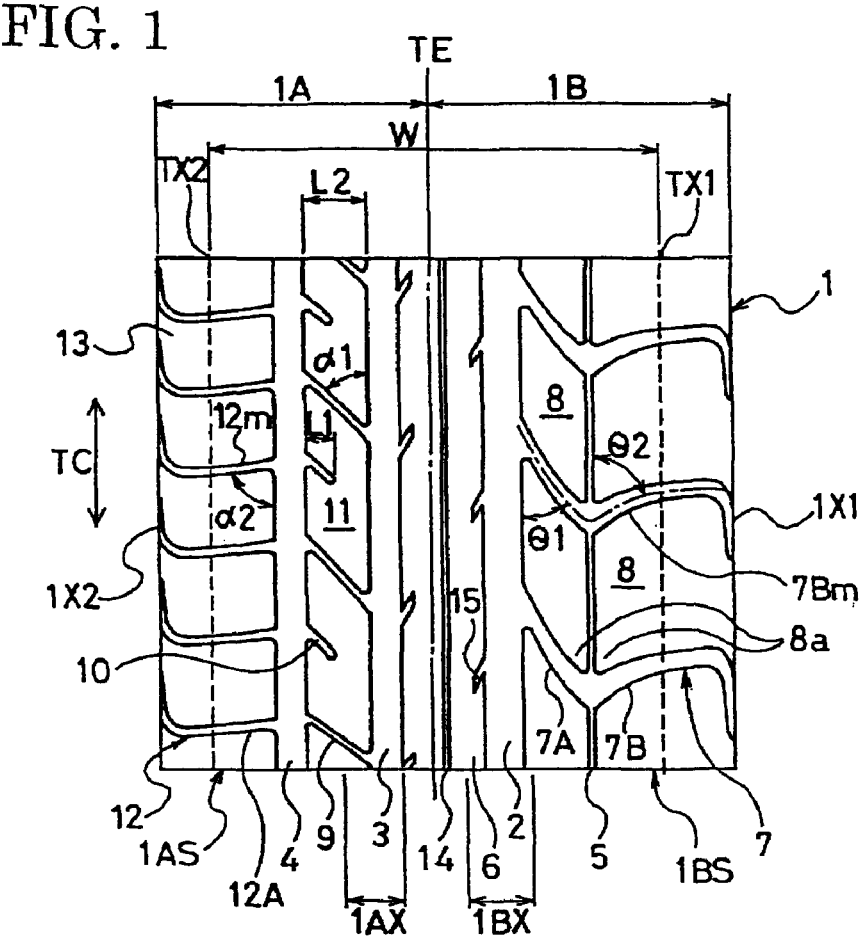
FIG. 1 is a partial development view of a tread surface showing an embodiment of a pneumatic tire according to the present invention.

Referring to FIG. 1, there is shown an embodiment of a pneumatic tire according to the present invention. This pneumatic tire is mounted on a vehicle with the left side in FIG. 1 being located on the inner side of the vehicle, and has a specified vehicle-mounting direction. Its tread surface 1 has a vehicle inner side region 1A on the left side of the equatorial plane TE of the tire and a vehicle outer side region 1B on the right side of the equatorial plane TE of the tire.

Three main grooves continuously extending in a straight manner in the circumferential direction TC of the tire are provided in the tread surface 1. The three main grooves include a first main groove 2 disposed in the vehicle outer side region 1B of the tread surface 1, and a second main groove 3 and a third main groove 4 disposed in the vehicle inner side region 1A of the tread surface 1. The first main groove 2 is provided on the tire equatorial plane TE side of the vehicle outer side region 1B. The second main groove 3 is placed on the tire equatorial plane TE side of the vehicle inner side region 1A. The third main groove 4 is disposed outward of the second main groove 3 in the widthwise direction of the tire. The vehicle inner side region 1A of the tread surface 1 has a shoulder area 1AS located outward of the third main groove 4 in the widthwise direction of the tire.

A circumferential narrow groove 5 continuously extending in a straight manner in the circumferential direction TC of the tire is provided in the vehicle outer side region 1B of the tread surface 1. The circumferential narrow groove 5 is located outward of the first main groove 2 in the widthwise direction of the tire, and is less in width than the first main groove 2. The vehicle outer side region 1B of the tread surface 1 has a shoulder area 1BS located outward of the circumferential narrow groove 5 in the widthwise direction of the tire. By providing the circumferential narrow groove 5 in the vehicle outer side region 1B of the tread surface 1 instead of a main groove, tread stiffness in an area of the vehicle outer side region 1B outward of the main groove 2 in the widthwise direction of the tire is enhanced.

The main grooves 2, 3 and 4 referred here are grooves having widths of 10 mm to 20 mm, and depths of 6 mm to 10 mm. The circumferential narrow groove 5 referred here is a groove having a width of 2 mm to 8 mm, and a depth of 2 mm to 8 mm.

A center rib 6 continuously extending in the circumferential direction TC of the tire is formed between the main grooves 2 and 3. Tread stiffness in a center area where the tire equatorial plane TE is located is secured by the center rib 6, thereby increasing driving stability on a dry road surface.

First lateral grooves 7 extending in the widthwise direction of the tire are disposed in the vehicle outer side region 1B of the tread surface 1 at prescribed intervals, which are greater than those of third lateral grooves 12 described later, in the circumferential direction TC of the tire. The first lateral grooves 7 extend from the first main groove 2 outward in the widthwise direction of the tire beyond the circumferential narrow groove 5 and further beyond one ground contact end TX1 of the tire to the other design end 1X1 of the tread surface 1. The extension of the first lateral grooves 7 to the one design end 1X1 as described above facilitates removing ridges of a mold for forming the first lateral grooves from a tire which has been vulcanized.

The groove area percentage of the first lateral grooves 7 in a tread surface area between the first main groove 2 and the one ground contact end TX1 of the tire is less than the groove area percentage of the third lateral grooves 12 in a tread surface area between the third main groove 4 and the other ground contact end TX2 of the tire. The first lateral grooves 7 are greater in width than the third lateral grooves 12. Blocks 8 are defined by the first main groove 2, first lateral grooves 7 and circumferential narrow groove 5 in an area of the vehicle outer side region 1B outward of the first main groove 2 in the widthwise direction of the tire.

Each of the first lateral grooves 7 has an inner groove portion 7A and an outer groove portion 7B. The inner groove portion 7A extends from the first main groove 2 outward in the widthwise direction of the tire to the circumferential narrow groove 5 located midway in the first lateral groove 7 in an inclined manner toward one side of the circumferential direction TC of the tire (downward in FIG. 1). The outer groove portion 7B extends from the inner groove portion 7A (circumferential narrow groove 5) outward in the widthwise direction of the tire beyond the one ground contact end TX1 of the tire to the one design end 1X1 in an inclined manner toward the other side of the circumferential direction TC of the tire (upward in FIG. 1). By extending the first lateral grooves 7 in an inclined manner as described above, noise (pattern noise) produced when edges (leading edges) of the blocks 8 facing the first lateral grooves 7 hit a road surface is reduced.

The inner groove portion 7A has a width which gradually increases from the first main groove 2 side outward in the widthwise direction of the tire to the circumferential narrow groove 5. The outer groove portion 7B has a width which gradually decreases from the circumferential narrow groove 5 outward in the widthwise direction of the tire to a position beyond the one ground contact end TX1 of the tire. The first lateral groove 7 gradually increases its width from the first main groove 2 side outward in the widthwise direction of the tire, and gradually decreases its width outward in the widthwise direction of the tire on reaching the circumferential narrow groove 5 disposed at a boundary position between the inner groove portion 7A and the outer groove portion 7B.

The inner groove portion 7A is in the form of an arc with a large curvature radius which is convex toward the one side of the circumferential direction TC of the tire in FIG. 1. However, the inner groove portion 7A may be in the form of a straight line. The outer groove portion 7B is in the form of an arc with a large curvature radius which is convex toward the other side of the circumferential direction TC of the tire. However, the outer groove portion 7B may be in the form of a straight line in a way similar to the inner groove portion 7A. Regarding the width of the first lateral groove 7, a part of the first lateral groove 7 between the first main groove 2 and the one ground contact end TX1 of the tire have a width in the range of 5 mm to 10 mm, which can be gradually increased or decreased properly according to a tire size and the like.

Second lateral grooves 9 extending in the widthwise direction of the tire and assistant lateral grooves 10 less in length than the second lateral grooves 9 are alternately disposed between the main grooves 3 and 4 at prescribed intervals in the circumferential direction TC of the tire. The second lateral grooves 9 extend straight from the second main groove 3 to the third main groove 4 in an inclined manner toward the one side of the circumferential direction TC of the tire. Blocks 11 are defined by the second lateral grooves 9 and main grooves 3 and 4 between the main grooves 3 and 4. The second lateral grooves 9 are disposed at intervals longer than the intervals of the third lateral grooves 12 described later. The defined blocks 9 are greater in length in the circumferential direction TC of the tire than blocks 13, described later, defined by the third lateral grooves 12, enhancing stiffness of the blocks 11 in the circumferential direction of the tire. In the embodiment shown in FIG. 1, the second lateral grooves 9 are disposed at intervals twice as long as those of the third lateral grooves 12.

The assistant lateral grooves 10 extend in an inclined manner toward the same direction as the second lateral grooves 9, and have one terminal ends which communicate with the third main groove and the other terminal ends which do not communicate with the second main groove 3 but are located within the blocks 11. Alternatively, the assistant lateral grooves 10 may extend to the second main groove 3. By extending the lateral grooves 9 and 10 in an inclined manner as described above, noise (pattern noise) produced when edges (leading edges) of the blocks 11 facing the lateral grooves 9 and 10 hit a road surface is reduced. The second lateral grooves 9 and assistant lateral grooves 10 extend in a straight manner in FIG. 1. Alternatively, the second lateral grooves 9 and assistant lateral grooves 10 may be in the forms of arcs having large curvature radii.

Third lateral grooves 12 extending in the widthwise direction of the tire are disposed at prescribed intervals in the circumferential direction TC of the tire in the shoulder area 1AS of the vehicle inner side region 1A of the tread surface 1. The third lateral grooves 12 extend from the third main groove 4 outward in the widthwise direction of the tire beyond the other ground contact end TX2 of the tire to the other design end 1X2 of the tread surface 1 in an inclined manner toward the one side of the circumferential direction TC of the tire. Blocks 13 are defined by the third main groove 4 and third lateral grooves 12 in the shoulder area 1AS.

By extending the third lateral grooves 12 in an inclined manner as described above, noise (pattern noise) produced when edges (leading edges) of the blocks 13 facing the third lateral grooves 13 hit a road surface is reduced. The extension of the third lateral grooves 13 to the other design end 1X2 facilitates removing ridges of a mold for forming the third lateral grooves 12 from a tire which has been vulcanized. The third lateral grooves 12 have main portions 12A, which can extend straight or in the forms of arcs having large curvature radii near straight lines.

A narrow groove 14 continuously extending in a straight manner in the circumferential direction TC of the tire is provided in a center area of the center rib 6. This facilitates bending the tread surface 1 in the form of an arc in cross section at a location of the narrow groove 14, whereby a tread profile in the form of an arc desired can be obtained when an air pressure is applied. The narrow groove 14 referred here is a groove having a width of 2 mm to 4 mm, and a depth of 2 mm to 3 mm. The narrow groove 14 may not be provided in attempting to make stiffness of the center rib 6 as high as possible. In FIG. 1, reference numeral 15 denotes auxiliary grooves disposed on the opposite sides of the center rib 6.

According to the present invention described above, the widths of the first lateral grooves 7 extending from the first main groove 2 outward in the widthwise direction of the tire beyond the one ground contact end TX1 of the tire gradually increase outward in the widthwise direction of the tire and gradually decrease thereafter, whereby the tire-circumferential lengths of the blocks 8 defined by the first lateral grooves 7 vary in the widthwise direction of the tire, which can make the surfaces of the blocks 8 produce pressure differences such that water in the first lateral grooves 7 is led to the boundary positions between the inner groove portions 7A and the outer groove portions 7B in coming into contact with a road surface. Therefore, water in the first lateral grooves 7 is more effectively led to the boundary positions between the inner groove portions 7A and the outer groove portions 7B by the first lateral grooves 7 than by lateral grooves which have the same groove areas as the first lateral grooves 7 and are constant in width, and can be expelled through the circumferential narrow groove 5 disposed at the boundary positions. Accordingly, driving stability during running on a wet road surface can be improved.

If a main groove similar to the first main groove 2 is disposed in the alternative of the circumferential narrow groove 5 to improve drainage characteristics, tread stiffness in an area of the vehicle outer side region 1B outward of the first main groove 2 in the widthwise direction of the tire is reduced, which decreases driving stability during running on a dry road surface. The circumferential narrow groove 5 does not create such a problem.

In the above embodiment, it is preferable in terms of driving stability during running on a dry road surface and drainage characteristics that the first main groove 2 in the vehicle outer side region 1B of the tread surface 1 be disposed in an area 1Bx from a position away by 8% of a ground contact width W of the tire to a position away by 25% of the ground contact width W of the tire from the tire equatorial plane TE outward in the widthwise direction of the tire (toward the vehicle outer side), and the second main groove 3 in the vehicle inner side region 1A of the tread surface 1 be disposed in an area 1Ax from a position away by 8% of the ground contact width W of the tire to a position away by 25% of the ground contact width W of the tire from the tire equatorial plane TE outward in the widthwise direction of the tire (toward the vehicle inner side).

If the main groove 2, 3 is located inward of the above area 1Ax, 1Bx in the widthwise direction of the tire, the center rib 6 is so narrow in width that enough rib stiffness can not be secured. Therefore, driving stability during running on a dry road surface is degraded. Further, since the main groove 2, 3 is located near the tire equatorial plane TE, an increase in air resonance arising from the main groove 2, 3 is incurred. If the main groove 2, 3 is located outward of the above area 1Ax, 1Bx in the widthwise direction of the tire, drainage characteristics are deteriorated. It is preferable in terms of balancing between driving stability during running on a dry road surface and drainage characteristics that the main groove 2, 3 be in an area from a position away by 10% of the ground contact width W of the tire to a position away by 20% of the ground contact width W of the tire from the tire equatorial plane TE.

The second main groove 3 has the same width as the third main groove 4 in FIG. 1. However, the second main groove 3 may be different in width from the third main groove 4. The width of the first main groove 2 is at least 110% of the width of one of the main grooves 3 and 4 which is less in width. By widening the width of the first main groove 2 as mentioned above, high drainage characteristics are secured by the first main groove 2 disposed in the vehicle outer side region 1B of the tread surface 1. If the width of the first main groove 2 is less than 110%, drainage characteristics are degraded, which creates a decrease in driving stability during running on a wet road surface. The upper limit of the width of the first main groove 2 is preferably equal to or less than 130% of the width of the narrower main groove in terms of driving stability during running on a dry road surface.

The first lateral grooves 7 are preferably disposed at intervals longer than those of the third lateral grooves 12 in the circumferential direction TC of the tire as described above. In FIG. 1, the intervals of the first lateral grooves 7 are twice as long as those of the third lateral grooves 12. By disposing the first lateral grooves 7 at intervals longer than those of the third lateral grooves 12 as described above, the blocks 8 formed in the vehicle outer side region 1B of the tread surface 1 have circumferential stiffness greater than the blocks 13 disposed in the vehicle inner side region 1A of the tread surface 1, whereby driving stability during cornering on a dry road surface can be enhanced. Further, the ground contacting area of each block 8 in the vehicle outer side region 1B of the tread surface 1 becomes large, which can enhance road-hugging properties during running on a wet road surface.

A greater shear force is exerted on the vehicle outer side region 1B of the tread surface 1 than on the vehicle inner side region 1A thereof during cornering or the like. Therefore, there is a tendency of creating irregular wear such that blocks in the vehicle outer side region 1B wear more rapidly than blocks in the vehicle inner side region 1A. By making the circumferential stiffness of the blocks 8 in the vehicle outer side region 1B greater than that of the blocks 13 in the vehicle outer side region 1B, the progress of wear of the blocks 8 in the vehicle outer side region 1B is delayed, and irregular wear can be suppressed. Further, the number of the intervals of the first lateral grooves 7 is less than the number of the intervals of the third lateral grooves 12, whereby noise arising from the number of the intervals can be reduced.

Figure 2:
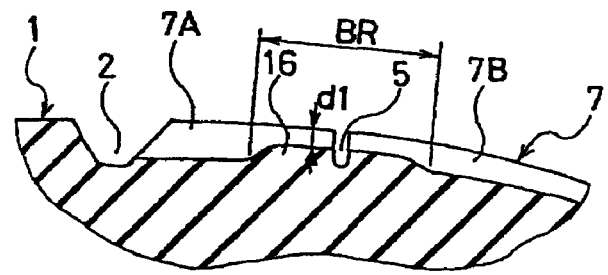
FIG. 2 is a partial enlarged view in cross section taken along a first lateral groove in FIG. 1.

As shown in FIG. 2, the first lateral grooves 7 preferably have less depths in areas BR including boundaries between the inner groove portions 7A and the outer groove portions 7B than in the other areas. That is, the first lateral grooves 7 are partially less in depth in the boundary areas BR, thereby providing bottom-raising portions 16 on the bottoms of the first lateral grooves 7.

This allows for enhancement of stiffness of parts 8a of the blocks 8 adjacent to crossing parts of the circumferential narrow groove 5 and the first lateral grooves 7. Therefore, the block parts 8a are suppressed from falling during cornering on a dry road surface, enabling an increase in driving stability. Further, by partially shallowing the first lateral grooves 7, the volume of the first lateral grooves 7 decreases. Therefore, noise arising from air resonance in the first lateral grooves 7 during passing can be reduced.

The depths d1 of the first lateral grooves 7 where the bottom-raising portions 16 are located are preferably 2 mm to 5 mm in terms of drainage characteristics and block stiffness. If the depths d1 of the first lateral grooves 7 are less than 2 mm, the bottom-raising portions 16 prevent water from flowing into the circumferential narrow groove 5 from the first lateral grooves 7. Therefore, drainage characteristics are deteriorated. If the depths d1 of the first lateral grooves 7 are greater than 5 mm, it is difficult to effectively increase stiffness of the block parts 8a. The first lateral grooves 7 can have depths in the range of 3 mm to 7 mm in areas which are located between the first main groove 2 and the one ground contact end TX1 of the tire and where the bottom-raising portions 16 do not exist.

The first lateral grooves 7 preferably extend in an inclined manner as described above, because noise produced when edges (leading edges) of the blocks 8 facing the first lateral grooves 7 hit a road surface can be reduced. However, the first lateral grooves 7 may extend along the widthwise direction of the tire without inclination. It is more preferably, as shown in FIG. 1, in terms of reducing noise arising from air resonance in the first lateral grooves 7 during passing that the first lateral grooves 7 be arranged such that the inner groove portions 7A are inclined toward the one side of the circumferential direction TC of the tire and the outer groove portions 7B are inclined toward the other side of the circumferential direction TC of the tire, or the groove portions 7A and 7B are inclined in the opposite manner to the above, whereby the groove portions 7A and 7B are not inclined in the same direction with respect to the circumferential direction TC of the tire.

In the case where the first lateral grooves 7 are inclined, the inclination angles $\theta 1$ of the inner groove portions 7A of the first lateral grooves 7 with respect to the circumferential direction TC of the tire are preferably in the range of 30° to 85° on acute angle sides thereof in terms of driving stability on a dray road surface, drainage characteristics during cornering and noise arising from the edges of the blocks 8. If the inclination angles $\theta 1$ of the inner groove portions 7A are less than 30°, stiffness of acute-angled corner parts 8a of the blocks 8 decreases, whereby driving stability on a dry road surface is degraded. If the inclination angles $\theta 1$ of the inner groove portions 7A are greater than 85°, a drainage capability during cornering is deteriorated, and noise produced when the edges of the blocks 8 hit a road surface increases. The inclination angles $\theta 2$ of the outer groove portions 7B of the first lateral grooves 7 with respect to circumferential direction TC of the tire are also preferably in the range of 30° to 85° on acute angle sides thereof because of the same reason as the above. The inclination angles $\theta 2$ of the outer groove portions 7B referred here are inclination angles of parts 7Bm of the outer groove portions 7B located in an area from the circumferential narrow groove 5 to the one ground contact end TX1 of the tire.

The inclination angles $\alpha 1$ of the second lateral grooves 9 with respect to the circumferential direction TC of the tire and the inclination angles $\alpha 2$ of the third lateral grooves 12 with respect to the circumferential direction TC of the tire are also preferably in the range of 30° to 85° on acute angle sides thereof, respectively, because of the same reason as the above. The inclination angles $\alpha 2$ of the third lateral grooves 12 referred here are inclination angles of parts 12m of the third lateral grooves 12 located in an area from the third main groove 4 to the other ground contact end TX2 of the tire.

When the inner groove portions 7A and outer groove portions 7B of the first lateral grooves 7, the second lateral grooves 9 and the third lateral grooves 12 extend in the forms of arcs, their inclination angles are as follows.

In the case of the inner groove portions 7A of the first lateral grooves 7, the inclination angles $\theta 1$ are inclination angles, with respect to the circumferential direction TC of the tire, of straight lines which connect inner terminal ends of the inner groove portions 7A communicating with the first main groove 2 and outer terminal ends of the inner groove portions 7A communicating with the circumferential narrow groove 5 on the centers of the first lateral grooves.

In the case of the outer groove portions 7B of the first lateral grooves 7, the inclination angles $\theta 2$ are inclination angles, with respect to the circumferential direction TC of the tire, of straight lines which connect inner terminal ends of the outer groove portions 7B communicating with the circumferential narrow groove 5 and parts of the outer groove portions 7B contacting with the one ground contact end TX1 of the tire on the centers of the first lateral grooves.

In the case of the second lateral grooves 9, the inclination angles $\alpha 1$ are inclination angles, with respect to the circumferential direction TC of the tire, of straight lines which connect inner terminal ends of the second lateral grooves 9 communicating with the second main groove 3 and outer terminal ends of the second lateral grooves 9 communicating with the third main groove 4 on the centers of the second lateral grooves.

In the case of the third lateral grooves 12, the inclination angles $\alpha 2$ are inclination angles, with respect to the circumferential direction TC of the tire, of straight lines which connect inner terminal ends of the third lateral grooves 12 communicating with the third main groove 4 and parts of the third lateral grooves 12 contacting with the other ground contact end TX2 of the tire on the centers of the third lateral grooves.

As shown in FIG. 1, it is preferable in terms of driving stability on a dry road surface that the assistant lateral grooves 10 do not extend to the second main groove 3. Alternatively, the assistant lateral grooves 10 may be arranged such that they extend from the second main groove 3 outward in the widthwise direction of the tire but do not communicate with the third main groove 4. The assistant lateral grooves 10 can extend from any one of the main grooves 3 and 4 toward the other main groove in an inclined manner toward the circumferential direction TC of the tire. In this case, the lengths L1 of the assistant lateral grooves 10 in the widthwise direction of the tire are preferably equal to or more than 20% of a length L2 between the main grooves 3 and 4 in the widthwise direction of the tire from the viewpoint of drainage characteristics, and equal to or less than 80% of the tire widthwise direction length L2 from the viewpoint of driving stability on a dry road surface.

Figure 3:
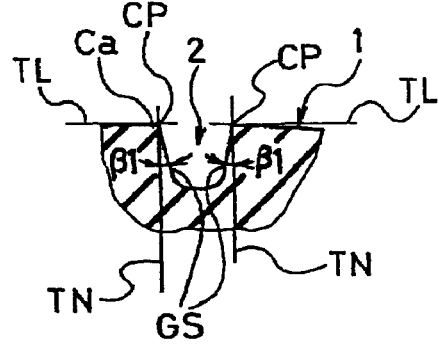
FIG. 3 is an enlarged cross-sectional view of a first main groove.
Figure 4:
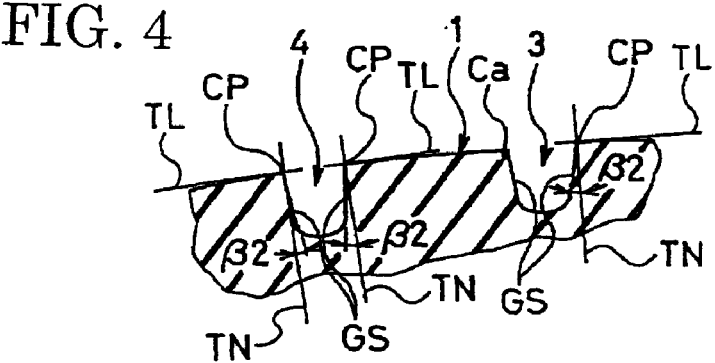
FIG. 4 is an enlarged cross-sectional view of second and third main grooves.

As shown in FIGS. 3 and 4, the main grooves 2 to 4 have groove wall surfaces GS. In cross section when the tire is cut in a plane that contains the axis of the tire, each of the groove wall surfaces GS is inclined with respect to a straight line (tire normal line) TN orthogonal to a tangential line TL drawn at an intersection point CP of the tread surface 1 in the form of an arc in cross section with the groove wall surface GS so as to pass the intersection point CP. In the case of enhancing a grip force in the vehicle outer side region 1B during running on a dry road surface and improving drainage characteristics in the vehicle inner side region 1A, the inclination angles $\beta 1$ of the groove wall surfaces GS of the first main groove 2 with respect to their straight lines TN are preferably greater than the inclination angles $\beta 1$ of the groove wall surfaces GS of the second and third main groove 3 and 4 with respect to their straight lines TN. This enables driving stability on a dry road surface and on a wet road surface to be further improved. The inclination angles $\beta 1$ can be in the range of 20° to 50°, and the inclination angles $\beta 2$ can be in the range of 100 to 40°. When the corners Ca of the blocks defined by the tread surface 1 and the groove wall surfaces GS are chamfered, the tire normal lines TN are drawn in a state where they are not chamfered.

Figure 5:
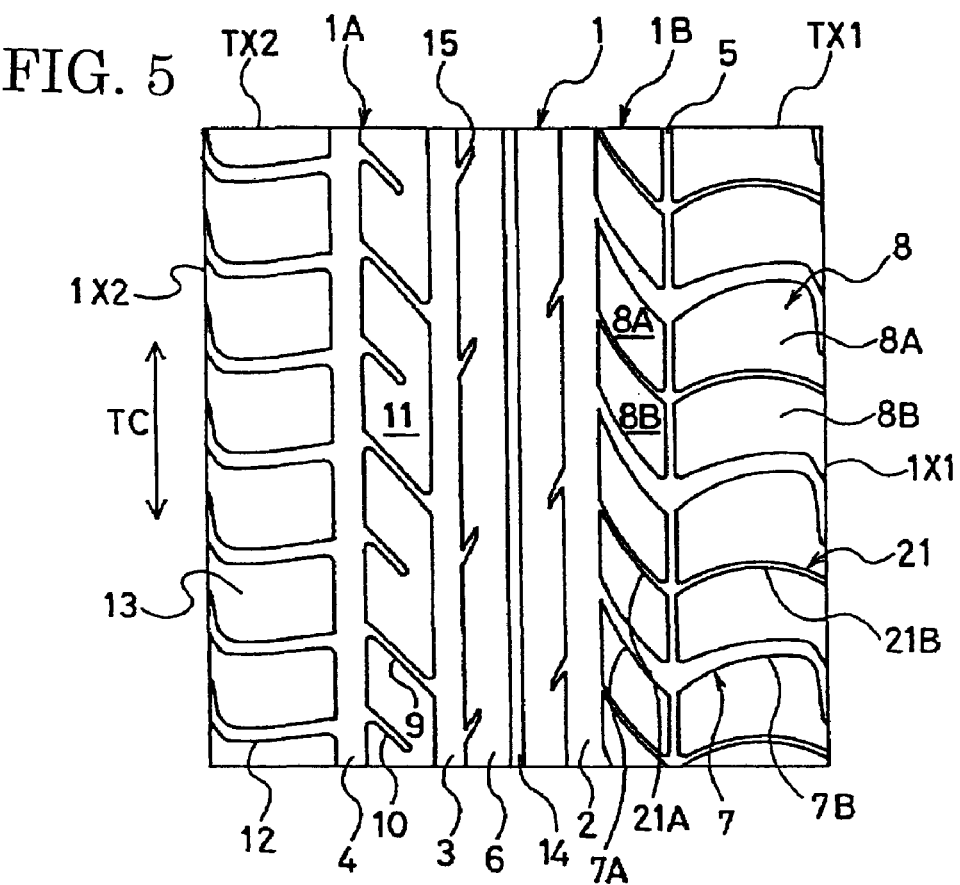
FIG. 5 is a partial development view of a tread surface showing another embodiment of a pneumatic tire according to the present invention.

Referring to FIG. 5, there is shown another embodiment of a pneumatic tire according to the present invention. The pneumatic tire of FIG. 5 has the same structure as the pneumatic tire of FIG. 1 described above except that a narrow lateral groove 21 which is less in width than the first lateral grooves 7 and extends in the widthwise direction of the tire is disposed between each pair of first lateral grooves 7 adjacent in the circumferential direction TC of the tire. Accordingly, like elements are referred by the like reference characters, and duplicate description will be omitted.

The narrow lateral groove 21 is located approximately in the center between the each pair of first lateral grooves 7, and narrow lateral grooves 21 and first lateral grooves 7 are alternately disposed at the same intervals as the third lateral grooves 12 in the circumferential direction of the tire. Each narrow lateral groove 21 has an inner narrow groove portion 21A and an outer narrow groove portion 21B. The inner narrow groove portion 21A extends from the first main groove 2 outward in the widthwise direction of the tire to the circumferential narrow groove 5 in an inclined manner toward the one side of the circumferential direction TC of the tire. The outer narrow groove portion 21B extends from the inner narrow groove portion 21A (circumferential narrow groove 5) outward in the widthwise direction of the tire beyond the one ground contact end TX1 of the tire to the one design end 1X1 in an inclined manner toward the other side of the circumferential direction TC of the tire.

The inner narrow groove portion 21A is formed in each block 8 between the first main groove 2 and the circumferential narrow groove 5, and the outer narrow groove portion 21B is formed in each block 8 in the shoulder area 1BS outward of the circumferential narrow groove 5 in the widthwise direction of the tire. Each block 8 are formed into two blocks 8A and 8B by the narrow lateral groove 21. The narrow lateral groove 21 has a substantially constant width, which is 1 mm to 4 mm, preferably 1 mm to 3 mm.

If the first lateral grooves 7 are provided at the same intervals as the third lateral grooves 12 in the tread pattern of FIG. 1 to attempt to further improve drainage characteristics, stiffness of the blocks 8 in the circumferential direction of the tire is reduced, whereby driving stability during cornering on a dry road surface is deteriorated and irregular wear that the blocks in the vehicle outer side region 1B wear more rapidly than the blocks in the vehicle inner side region 1A is created. Therefore, in the embodiment of FIG. 5, a narrow lateral groove 21 less in width than the first lateral grooves 7 is disposed between each pair of first lateral grooves 7 adjacent in the circumferential direction TC of the tire. The narrow lateral grooves 21 and first lateral grooves 7 are alternately disposed at the same intervals as the third lateral grooves 12 in the circumferential direction TC of the tire, whereby one block 8A (or 8B) can be suppressed from falling by the other block 8B (or 8A). Therefore, while drainage characteristics is further improved, a decrease in driving stability during cornering on a dry road surface can be suppressed, compared to the tire having a tread pattern of FIG. 1. The creation of the irregular wear that the blocks 8A and 8B in the vehicle outer side region 1B wear more rapidly than the blocks 13 in the vehicle inner side region 1A can also be suppressed.

Figure 6:
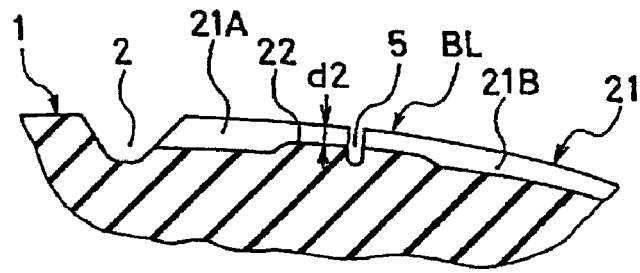
FIG. 6 is a partial enlarged view in cross section taken along a narrow lateral groove in FIG. 5.

As shown in FIG. 6, the narrow lateral grooves 21 are preferably arranged such that a bottom-raising portion 22 is provided on the bottom of each narrow lateral groove 21 in an area BL crossing with the circumferential narrow groove 5 and the narrow lateral groove 21 is partially less in depth in the area BL than in the other area. This allows for enhancement of stiffness of corners of the blocks 8A and 8B adjacent to crossing parts of the circumferential narrow groove 5 and the narrow lateral grooves 21. Therefore, the corners of the blocks 8A and 8B are suppressed from falling during cornering on a dry road surface, enabling an increase in driving stability on a dry road surface. Further, a contribution to improvement of resistance to the above-mentioned irregular wear is obtained.

The depths d2 of the narrow lateral grooves 21 where the bottom-raising portions 22 are located are preferably 1 mm to 5 mm in terms of drainage characteristics and block stiffness. If the depths d2 of the narrow lateral grooves 21 are less than 1 mm, the bottom-raising portions 22 prevent water from flowing into the circumferential narrow groove 5 from the narrow lateral grooves 21. Therefore, a drainage effect by the narrow lateral grooves 21 is deteriorated. If the depths d2 of the narrow lateral grooves 21 are greater than 5 mm, it is difficult to effectively increase stiffness of the corners of the blocks 8A and 8B. The narrow lateral grooves 21 can have depths in the range of 2 mm to 6 mm in areas which are located between the first main groove 2 and the one ground contact end TX1 of the tire and where the bottom-raising portions 22 do not exist.

In the present invention, the first lateral grooves 7 and circumferential narrow groove 5 described above are preferably provided in the vehicle outer side region 1B of the tread surface 1 as shown in FIG. 1 in terms of effectively enhancing drainage characteristics particularly during cornering. However, the pneumatic tire of the present invention may be one having the first lateral grooves 7 and circumferential narrow groove 5 in the vehicle inner side region 1A of the tread surface 1.

In the above embodiments, the pneumatic tires having a specified vehicle-mounting direction have been described. However, the above-described pneumatic tires having the first lateral grooves 7 and circumferential narrow groove 5 may be pneumatic tires having no specified vehicle-mounting direction.

In the present invention, it is preferable that the third lateral grooves 12 extend from the third main groove 4 in an inclined manner toward the one side of the circumferential direction TC of the tire (downward in FIG. 1) like the inner groove portions 7A of the first lateral grooves 7, and that second lateral grooves 9 extend from the second main groove 3 in an inclined manner toward the other side of the circumferential direction TC of the tire (upward in FIG. 1) like the outer groove portions 7B of the first lateral grooves 7, as shown in the embodiments described above. However, as show in FIG. 7, the third lateral grooves 12 may extend from the third main groove 4 outward in the widthwise direction of the tire in an inclined manner toward the other side of the circumferential direction TC of the tire. The third lateral grooves 12 may extend in an inclined manner toward any one of the one side and the other side of the circumferential direction TC of the tire. When the third lateral grooves 12 are inclined toward the other side of the circumferential direction TC of the tire, the inclination angles α2' of the third lateral grooves 12 with respect to the circumferential direction TC of the tire can be the same as the above inclination angles α2 on acute angle sides thereof.

Figure 7:
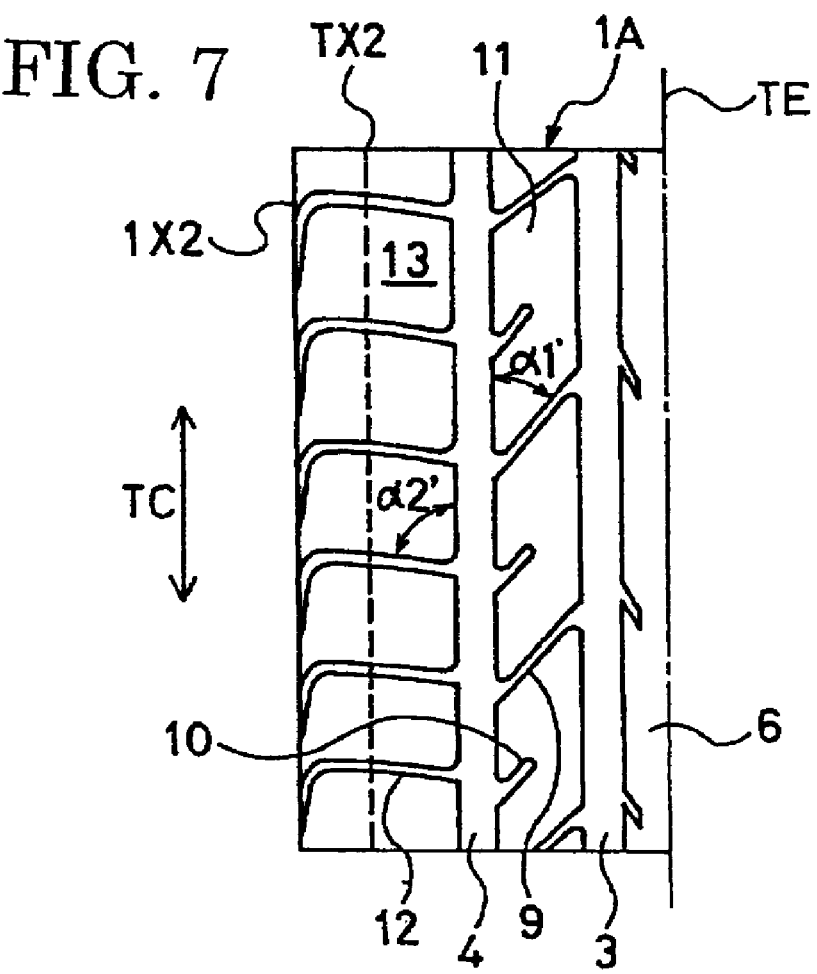
FIG. 7 is a partial development view showing another pattern in a vehicle inner side region of the tread surface.

Also, as shown in FIG. 7, the second lateral grooves 9 may extend from the second main groove 3 outward in the widthwise direction of the tire in an inclined manner toward the one side of the circumferential direction TC of the tire. The second lateral grooves 9 can also extend in an inclined manner toward any one of the one side and the other side of the circumferential direction TC of the tire. When the second lateral grooves 9 are inclined toward the one side of the circumferential direction TC of the tire, the inclination angles α1' of the second lateral grooves 9 with respect to the circumferential direction TC of the tire can be the same as the above inclination angles α1 on acute angle sides thereof.

The present invention is preferably applicable to pneumatic tires for passenger cars in particular. However, there is no limitation thereto. The present invention is also applicable to other pneumatic tires.

In the present invention, the ground contact width W of the tire is measured under conditions such that a tire is mounted on an applicable rim specified in JATMA (JATMA YEAR BOOK 2006) and is inflated to an air pressure of 220 kPa, and a load equivalent to 88% of the maximum load capacity specified in JATMA is applied thereto when the tire is for passenger cars. When the tire is for other use, the ground contact width W of the tire is measured under conditions such that the tire is mounted on an applicable rim specified in JATMA and is inflated to an air pressure corresponding to the maximum load capacity specified in JATMA, and a load equivalent to the maximum load capacity is applied thereto. The ground contact ends TX1 and TX2 of the tire are ground contact ends of the tread surface 1 located outermost in the widthwise direction of the tire when the tire comes into contact with a road surface with the above ground contact width W of the tire. The inclination angles β1 and β2 of the groove wall surfaces of the main grooves 2 to 4 are measured under the same conditions as the measurement of the above ground contact width W of the tire except that no load is applied thereto.

Example 1

Prepared respectively were tires according to the present invention tires 1 and 2 and control tire, each having a tire size of 245/40R18, the present invention tire 1 having a tread pattern shown in FIG. 1, the present invention tire 2 having the same pattern as the present invention tire 1 except that bottom-raising portions were provided in the first lateral grooves, the control tire having the same pattern as the present invention tire 1 except that the first lateral grooves in the vehicle outer side region of the tread surface were constant in width.

The present invention tires 1 and 2 and control tire are same in the groove area percentage of the first lateral grooves in the vehicle outer side region of the tread surface, and the depths of the first lateral grooves of each of the present invention tires 1 and 2 and control tire are 5.5 mm. The width and depth of the circumferential narrow groove of each tire is 2.5 mm and 6.4 mm, respectively. In the present invention tire 2, the depths of the lug grooves are 3 mm at locations of the bottom-raising portions.

The respective tires were assembled to 8.5 J sized rims, inflated to an air pressure of 220 kPa, and mounted on a four-wheel-drive car (test vehicle) of 2000 cc displacement. Evaluation testing for wet driving stability, dry driving stability and noise during passing was carried out according to the following methods, obtaining the results shown in Table 1.

Wet Driving Stability

Feeling testing for driving stability on a wet road test course was carried out by a test driver. The evaluation result thereof is represented by an index where the control tire is 100. As the index is greater, wet driving stability is better.

Dry Driving Stability

Feeling testing for driving stability on a dry road test course was carried out by a test driver. The evaluation result thereof is represented by an index where the control tire is 100. As the index is greater, dry driving stability is better.

Noise During Passing

A sound pressure level was measured when the test vehicle was run on a dry road test course automatically in a state of lifting a driver's foot off the gas pedal from a speed of 100 km/h to a speed of 0. The measured value was converted into a value of a sound pressure level under conditions of a speed of 55 km/h and a road surface temperature of 5 degrees C. The conversion result is represented by an index where the control tire is 100. The greater index indicates lower noise during passing.

TABLE 1

|  | Control Tire | Present Invention Tire 1 | Present Invention Tire 2 |
| --- | --- | --- | --- |
| Wet Driving Stability | 100 | 105 | 103 |
| Dry Driving Stability | 100 | 100 | 105 |
| Noise During Passing | 100 | 100 | 103 |

As seen from Table 1, the present invention tires can improve wet driving stability (wet performance). As seen from the present invention tire 2, wet performance can be improved and noise during passing can also be reduced while driving stability on a dry road surface is enhanced by partially shallowing the lug grooves to provide the bottom-raising portions.

Example 2

Prepared respectively were test tires 1 to 9 each having the same tire size as in EXAMPLE 1 and a tread pattern shown in FIG. 1, in which the positions of the first main groove in the vehicle outer side region of the tread surface and the second main groove in the vehicle inner side region of the tread surface, and the width of the first main groove were as shown in Table 2.

In each of the test tires 1 to 9, the second main groove and the third main groove in the vehicle inner side region of the tread surface are the same in width (16 mm), the inclination angles θ1 of the inner groove portions of the first lateral grooves are 45°, the inclination angles θ2 of the outer groove portions of the first lateral grooves are 80°, the inclination angles α1 of the second lateral grooves are 60°, the inclination angles α2 of the third lateral grooves are 85°, and the tire-widthwise direction lengths L1 of the assistant lateral grooves are 52% of the tire-widthwise-direction length L2. The depths of the first lateral grooves and the width and depth of the circumferential narrow groove of each test tire are the same as in EXAMPLE 1.

Figure 8:
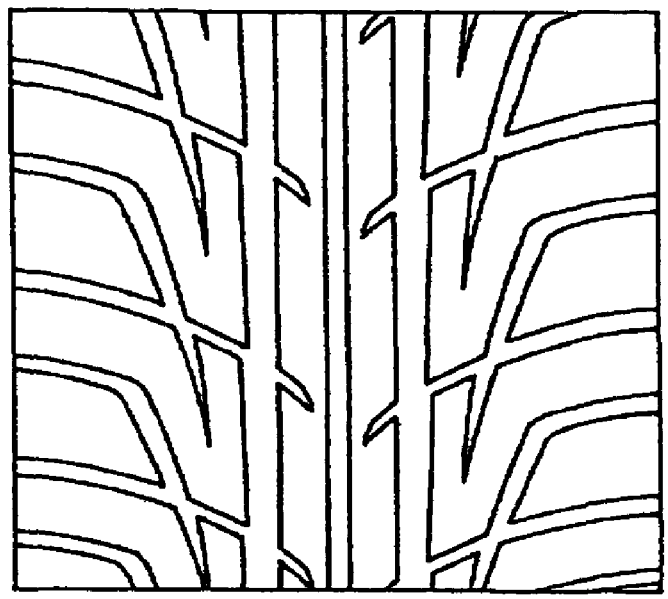
FIG. 8 is a partial development view of the tread surface of a control tire in EXAMPLES 2 and 3.

The respective test tires were mounted on a four-wheel-drive car of 2000 cc displacement as in EXAMPLE 1. Evaluation testing for wet driving stability and dry driving stability was carried out according to the methods shown in EXAMPLE 1, obtaining the results shown in Table 2. The results of wet driving stability and dry driving stability shown in Table 2 are each represented by an index where a tire having a tread pattern shown in FIG. 8 is 100. The greater index means better performance.

TABLE 2

| | Positions of First and Second Main Grooves | Width of First Main Groove | Dry Driving Stability | Wet Driving Stability |
|---|---|---|---|---|
| Test Tire 1 | 0.06W *1 | 120% | 102 | 104 |
| Test Tire 2 | 0.08W *1 | 120% | 105 | 104 |
| Test Tire 3 | 0.15W *2 | 120% | 107 | 104 |
| Test Tire 4 | 0.25W *3 | 120% | 109 | 103 |
| Test Tire 5 | 0.30W *3 | 120% | 110 | 102 |
| Test Tire 6 | 0.15W *2 | 100% | 109 | 95 |
| Test Tire 7 | 0.15W *2 | 110% | 108 | 103 |
| Test Tire 8 | 0.15W *2 | 130% | 106 | 105 |
| Test Tire 9 | 0.15W *2 | 140% | 102 | 105 |

Note)
The mark "*1" means that the positions of the first and second main grooves are positions at open ends of the first and second main grooves inward in the widthwise direction of the tire.
The mark "*2" means that the positions of the first and second main grooves are positions on the centers of the first and second main grooves.
The mark "*3" means that the positions of the first and second main grooves are positions at open ends of the first and second main grooves outward in the widthwise direction of the tire.

As seen from the test tires 2 to 4 in Table 2, wet driving stability (wet performance) and dry driving stability (dry performance) can be enhanced together with their values being equal to or more than 103 by disposing the first and second main grooves in areas from a position away by 8% of the ground contact width of the tire to a position away by 25% of the ground contact width of the tire from the equatorial plane of the tire.

Further, as seen from the test tires 3, 7 and 8 in Table 2, wet performance and dry performance can be enhanced together with their values being equal to or more than 103 by making the width of the first main groove in the range of 110% to 130%.

Example 3

Prepared respectively were test tires 10 to 12 each having the same tire size as in EXAMPLE 1, the test tire 10 having a tread pattern shown in FIG. 1, the test tires 11 and 12 having tread patterns shown in FIG. 5

In each of the test tires 11 and 12, the narrow lateral grooves have structures shown in FIG. 6, the widths of the narrow lateral grooves are 3 mm, the depths of the narrow lateral grooves are 2 mm in areas having the bottom-raising portions and are 4 mm in the other areas. In each of the test tires, the second main groove and the third main groove in the vehicle inner side region of the tread surface are the same in width (16 mm), and the width of the first main groove is 120% of that of the second main groove. In each of the test tires, the first main groove and second main groove are disposed at positions away by 25% of the ground contact width of the tire from the equatorial plane of the tire, respectively. In each of the test tires, the inclination angles θ1, θ2, α1 and α2, the tire-widthwise direction lengths L1 of the assistant lateral grooves, the depths of the first lateral grooves and the width and depth of the circumferential narrow groove are the same as in EXAMPLE 2. In each of the test tires, the inner groove portions of the first lateral grooves gradually increase in width in the range from 6.5 mm to 10 mm, and the outer grove portions of the first lateral grooves gradually decrease in width in the range from 9.5 mm to 5.5 mm. The inclination angles θ1 and θ2 of the groove wall surfaces of the main grooves of each test tire are as shown in Table 3.

The respective test tires were mounted on a four-wheel-drive car of 2000 cc displacement as in EXAMPLE 1. Evaluation testing for wet driving stability and dry driving stability was carried out according to the methods shown in EXAMPLE 1, obtaining the results shown in Table 3. The results of wet driving stability and dry driving stability shown in Table 3 are also each represented by an index where a tire having a tread pattern shown in FIG. 8 is 100. The greater index means better performance.

TABLE 3

| | Inclination Angles β1 of First Main Groove Wall Surfaces | | Inclination Angles β2 of Second and Third Main Groove Wall Surfaces | | Dry Driving Stability | Wet Driving Stability |
|---|---|---|---|---|---|---|
| | Outside | Inside | Outside | Inside | | |
| Test Tire 10 | 25° | 25° | 25° | 25° | 109 | 103 |
| Test Tire 11 | 25° | 25° | 25° | 25° | 104 | 106 |
| Test Tire 12 | 35° | 35° | 15° | 15° | 106 | 108 |

As seen from Table 3, the test tire 11 having the narrow lateral grooves can further improve driving stability on a wet road surface while a decrease in driving stability on a dry road surface is suppressed to 104, compared to the test tire 10 having no narrow lateral grooves, and wet performance can be further improved while dry performance is suppressed from decreasing by disposing the narrow lateral grooves.

As seen from the test tires 11 and 12, dry performance and wet performance can be further improved by making the inclination angles β1 of the wall surfaces of the first main grooves greater than the inclination angles β2 of the wall surfaces of the second and third main grooves.

INDUSTRIAL APPLICABILITY

The present invention having the aforementioned excellent effects is preferably applicable to pneumatic tires used for vehicles such as passenger cars.

What is claimed is:

1. A pneumatic tire comprising:
a tread surface;
a first main groove extending in a circumferential direction of the tire and being provided in the tread surface;
first lateral grooves extending from the first main groove outward in a widthwise direction of the tire beyond one ground contact end of the tire and being disposed at prescribed intervals in the circumferential direction of the tire;
blocks being defined by the first main groove and the first lateral grooves;
wherein the first lateral grooves include inner groove portions and outer groove portions, with boundary positions therebetween, the inner groove portions having widths, the inner groove portions extending with the widths gradually increasing from the first main groove outward in the widthwise direction of the tire to the boundary positions of the first lateral grooves in an inclined manner toward one side of the circumferential direction of the tire, the outer groove portions having widths, the outer groove portions extending with the widths gradually decreasing from the boundary positions outward in the widthwise direction of the tire, the outer groove portions also extending beyond the one ground contact end of the tire in an inclined manner toward the other side of the circumferential direction of the tire; and
wherein a circumferential narrow groove, which extends in the circumferential direction of the tire and is less in width than the first main groove, is disposed at the boundary positions between the inner groove portions and the outer groove portions,
wherein the pneumatic tire has a specified vehicle-mounting direction, the tread surface having a vehicle inner side region located on a vehicle inner side of an equatorial plane of the tire when the tire is mounted on a vehicle, and a vehicle outer side region located on a vehicle outer side of the equatorial plane of the tire is mounted on the vehicle, the first main groove and the first lateral grooves being disposed in the vehicle outer side region of the tread surface.

2. The pneumatic tire according to claim 1, wherein the first lateral grooves are partially less in depth in areas including the boundaries between the inner groove portions and outer groove portions of the first lateral grooves.

3. The pneumatic tire according to claim 1, wherein:
two main grooves extending in the circumferential direction of the tire are provided in the vehicle inner side region of the tread surface, the two main grooves comprising a second main groove and a third main groove, the second main groove being disposed in an area from a position away by 8% of a ground contact width of the tire to a position away by 25% of the ground contact width of the tire from the equatorial plane of the tire, the third main groove being disposed outward, in the widthwise direction of the tire, of the area from the position away by 8% to the position away by 25% of the ground contact width of the tire;
second lateral grooves are disposed at prescribed intervals in the circumferential direction of the tire between the second main groove and the third main groove, the second lateral grooves extending from the second main groove outward in the widthwise direction of the tire to the third main groove in an inclined manner toward the circumferential direction of the tire, blocks being defined by the second main groove, third main groove and second lateral grooves;
third lateral grooves are disposed at prescribed intervals in the circumferential direction of the tire in a shoulder area outward of the third main groove in the widthwise direction of the tire, the third lateral grooves extending from the third main groove outward in the widthwise direction of the tire beyond the other ground contact end of the tire in an inclined manner toward the circumferential direction of the tire, blocks being defined by the third main groove and third lateral grooves;
the first main groove is disposed in an area from a position away by 8% of the ground contact width of the tire to a position away by 25% of the ground contact width of the tire from the equatorial plane of the tire in the vehicle outer side region of the tread surface, the first main groove having a width in a range of 110% to 130% of a width of one of the second main groove and third main groove which is less in width;
a center rib extending continuously in the circumferential direction of the tire is formed between the first main groove and the second main groove; and
the first lateral grooves are disposed in the circumferential direction of the tire at intervals longer than the intervals of the third lateral grooves.

4. The pneumatic tire according to claim 3, wherein the first lateral grooves are greater in width than the third lateral grooves.

5. The pneumatic tire according to claim 3, wherein each of the inner groove portions and outer groove portions of the first lateral grooves has an inclination angle of 30° to 85° with respect to the circumferential direction of the tire on an acute angle side thereof.

6. The pneumatic tire according to claim 3, wherein the third lateral grooves have inclination angles of 30° to 85° with respect to the circumferential direction of the tire on acute angle sides thereof.

7. The pneumatic tire according to claim 6, wherein the third lateral grooves extend from the third main groove outward in the widthwise direction of the tire beyond the other ground contact end of the tire in an inclined manner toward the one side of the circumferential direction of the tire.

8. The pneumatic tire according to claim 6, wherein the second lateral grooves extend from the second main groove outward in the widthwise direction of the tire to the third main groove in an inclined manner toward the other side of the circumferential direction of the tire.

9. The pneumatic tire according to claim 3, wherein the second lateral grooves have inclination angles of 30° to 85° with respect to the circumferential direction of the tire on acute angle sides thereof.

10. The pneumatic tire according to claim 3, wherein the second lateral grooves are disposed at intervals twice as long as those of the third lateral grooves, an assistant lateral groove being disposed between each pair of adjacent second lateral grooves, the assistant lateral groove extending from one of the second main groove and third main groove toward the other main groove in an inclined manner toward a same direction as the second lateral grooves, the assistant lateral groove having a length in the widthwise direction of the tire which is 20% to 80% of a length between the second main groove and the third main groove in the widthwise direction of the tire.

11. The pneumatic tire according to claim 10, wherein the assistant lateral groove extends from the third main groove.

12. The pneumatic tire according to claim 3, wherein a narrow groove extending in the circumferential direction of the tire is provided in the center rib, the narrow groove having a width of 2 to 4 mm and a depth of 2 to 3 mm.

13. The pneumatic tire according to claim 3, wherein the first lateral grooves are disposed at intervals twice as long as those of the third lateral grooves, a narrow lateral groove less in width than the first lateral grooves being disposed between each pair of adjacent first lateral grooves, the narrow lateral groove extending from the first main groove outward in the widthwise direction of the tire.

14. The pneumatic tire according to claim 13, wherein the narrow lateral groove extends across the circumferential narrow groove and beyond the one ground contact end of the tire, the narrow lateral groove are partially less in width in an area where the narrow lateral groove crosses with the circumferential narrow groove.

15. The pneumatic tire according to claim 3, wherein the first main groove, second main groove and third main groove have groove wall surfaces, each groove wall surface being inclined with respect to a straight line in cross section when the tire is cut in a plane that contains an axis of the tire, the straight line being orthogonal to a tangential line drawn at an intersection point of the tread surface in a form of an arc in cross section with the groove wall surface so as to pass the intersection point, the groove wall surface of the first main groove having an inclination angle $\beta 1$ with respect to the straight line, the groove wall surfaces of the second main groove and third main groove having inclination angles $\beta 2$ with respect to the straight line, the inclination angle $\beta 1$ being greater than the inclination angles $\beta 2$.

* * * * *

UNITED STATES PATENT AND TRADEMARK OFFICE
CERTIFICATE OF CORRECTION

PATENT NO.        : 8,205,651 B2
APPLICATION NO.   : 12/302234
DATED             : June 26, 2012
INVENTOR(S)       : Yukihiko Ohki et al.

Page 1 of 1

It is certified that error appears in the above-identified patent and that said Letters Patent is hereby corrected as shown below:

On the Title page, item (56) References Cited:

Under "U.S. PATENT DOCUMENTS," please insert:

-- 2002/0112801   A1   8/2002   Matsumoto --

Signed and Sealed this
Second Day of April, 2013

Teresa Stanek Rea
*Acting Director of the United States Patent and Trademark Office*